May 17, 1932. T. H. SYMINGTON 1,858,720
RAILWAY CAR TRUCK
Filed April 18, 1929

Inventor
Thomas H. Symington

By
John W. Darley
Attorney

Patented May 17, 1932

1,858,720

UNITED STATES PATENT OFFICE

THOMAS H. SYMINGTON, OF BALTIMORE, MARYLAND, ASSIGNOR TO T. H. SYMINGTON & SON, INC., OF BALTIMORE, MARYLAND, A CORPORATION OF MARYLAND

RAILWAY CAR TRUCK

Application filed April 18, 1929. Serial No. 356,063.

My invention relates to railway car trucks.

One object of my invention is to devise a car truck including cast side frames, the tension members of which are designed with a lessened beam length in the bottom tie portions for the purpose of approximating a true suspension line in the tension member and correspondingly reducing the bending moments therein and other secondary stresses at the junction of the diagonal tension members with the bottom tie portion.

A further object is to devise a truck of the character described and particularly one in which the so-called spring plank is eliminated, substituting therefor a simple and novel form of connecting link which improves the self-squaring action of the non-rigid type of truck when leaving curves.

A further object is to devise a truck as above noted in which special means are employed to insure the retention of the truck springs in position on the side frame and in which the spring grouping has been arranged to permit the attainment of a wheel base for the seventy ton truck that is the same as that of the fifty-five ton truck, with a corresponding reduction in weight and increase in strength of the side frames.

The truck which forms the basis of the present application is a modification of that disclosed in my copending application for a Railway car truck, Serial No. 343,947, filed March 2, 1929, but includes the general advantages of the latter truck in respect of the shortened beam length of the bottom tie portion of the tension member, the engagement of the truck bolster with the side frames, the flange construction for retaining the springs in position, and the substitution of a tie link for the usual spring plank. The improvements over this structure, as disclosed in this application, comprise generally a modified pin arrangement by which the ends of the truck bolster have sliding engagement with the side frames, a disposition of the truck springs whereby the side frames for a seventy ton truck may be shortened to obtain the same wheel base as that of the fifty-five ton truck, and the use of a pipe with suitable ends as a tie link between the side frames.

These and further objects of my invention will be set forth in the following specification, reference being had to the accompanying drawings, and the novel means by which said objects are effectuated will be definitely pointed out in the claims.

Figure 1:
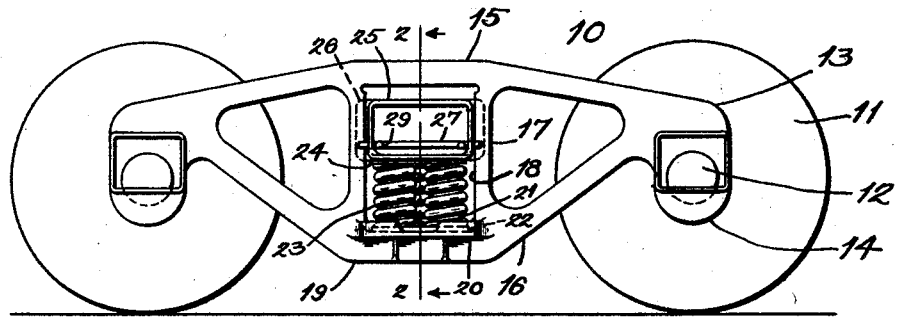
Fig. 1 is a side elevation of my improved truck.
Figure 2:
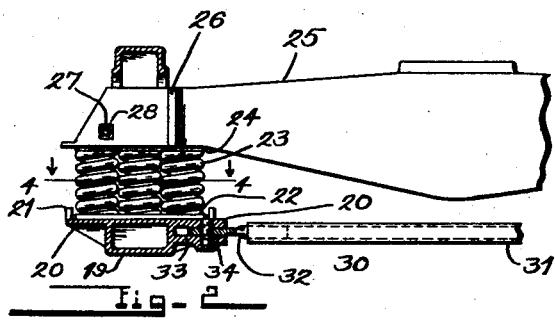
Fig. 2 is a transverse section along the line 2—2 in Fig. 1 through one of the side frames and the truck bolster.
Figure 3:
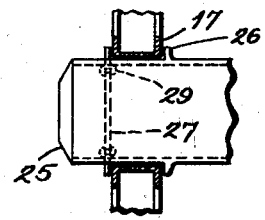
Fig. 3 is a plan view of one end of the truck bolster as viewed in Fig. 2.
Figure 4:
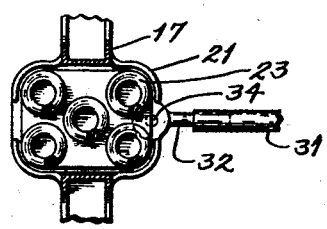
Fig. 4 is a section along the line 4—4 in Fig. 2.
Figure 5:
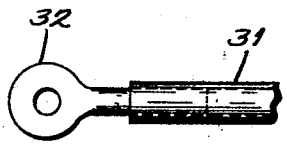
Fig. 5 is an enlarged plan view of one end of the tie link which connects the side frames in the usual location of the spring plank.

The numeral 10 represents my improved truck which is provided with the usual wheels 11 having the journals 12 on which are supported the cast side frames 13. Said frames are illustrated as including integral journal boxes 14, although this feature does not form any part of my invention, as separate boxes may be employed if desired.

Each side frame 13 comprises a compression member 15, tension member 16, and bolster columns 17, said members and columns defining the window opening 18 which is of uniform width and size to accommodate the truck bolster hereinafter described. The lower end of the window opening 18 is closed by the bottom tie portion 19 of the tension member 16, and owing to the uniform width of said opening and the improved spring grouping hereinafter described, said portion will be shorter than in the side frames customarily employed. The portion 19 is preferably of box section with flanges 20 extending outwardly from the sides thereof in a plane common with the upper web of the section to form the usual support for the spring group. The peripheral edges of said flanges adjacent the corner springs hereinafter described are turned upwardly as at 21 for a purpose presently explained.

A spring seat 22 is positioned on the upper side of the portion 19 and truck springs 23 rest on said seat. Said springs are preferably five in number and the group is arranged with inner and outer pairs of springs and a single intermediate spring, the longitudinal axis of the group being disposed transversely of the side frame. Carried on the tops of said springs is a spring cap 24 on which rests one end of a truck bolster 25. The latter has sliding engagement with the inner side of the frame 15 by means of an integral lug 26 and with the opposite side of said frame by a bar 27 which passes through the hole 28 in said bolster, the ends of said bar extending beyond the side walls of the latter element for sliding contact with the frame. After being positioned through the section of the bolster, endwise movement of the pin 27 is prevented by means of rivets 29, bolts, pins, or articles of similar nature which contact with the inner walls of the truck bolster.

In place of the customary spring plank which extends between the side frames, a simple tie link is employed. This link comprises a length of pipe or tubing 31 which has secured at the ends thereof an eye 32. Said eye is received between the inner flange 20 and a tongue 33 spaced therebelow and appropriately shaped. Pivotal connection between the eye 32 and the side frame is effected by means of a pin 34 which passes through appropriate holes formed in the flange 20, eye 32, and tongue 33, the hole in said tongue being restricted adjacent the lower side thereof so that the pin 34 is carried thereby and prevented from dropping vertically downward. Upward movement of said pin is prevented by a spring plate 22 which extends partially or over the hole. Accordingly, the link 30 is amply secured against inadvertent disengagement from the side frames.

From the foregoing, it will be apparent that my improved truck embodies several important advantages. The upturned flanges 21 around the spring seat effectively prevent the springs 23 from jumping out of the side frames during transit, while the shortened beam length of the tension member produces a stronger frame for the same weight of metal, the latter in turn permitting a simpler design and improving the casting quality of the frame. The character of the spring grouping also assists in shortening the beam length of the bottom tie portion 19 and permits the attainment of the same wheel base for the seventy ton truck as for the fifty five ton truck. Therefore, the side frames for the former may be lightened in weight. The usual shimming in order to preserve the coupler height as the wheels wear is preferably effected between the tops of the springs and the under side the truck bolster, thereby maintaining the working depth of the spring pocket which is formed by the flanges 21.

The use of the tie link 30 is of particular advantage in the non-rigid type of truck since, being free from the load which is imposed on the standard spring plank through the springs, it does not hinder the self-squaring action of the truck, while at the same time providing the desired connection between the side frames. The use of pipe for the major length of the link 30 provides a stronger construction relative to a simple rod, particularly against the compressive stresses engendered under lateral pressure. Finally, it will be observed that the pin 27 is preferably inserted through the section of the truck bolster closer to the lower side thereof for the purpose of reducing the distance therebetween and the journals 12, with a corresponding reduction in the twisting moments acting on the latter during lateral movements of the truck.

Figure 6:
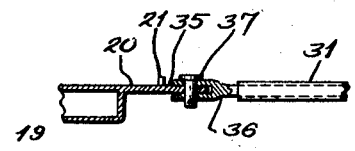
Fig. 6 shows a modified link connection.

In Fig. 6 is illustrated a modified arrangement of the tie link connection with the side frame. The inner flange 20 is extended beyond its normal width to form a tongue 35 which is received within the fork end of a clevis 36 which is attached to one end of the pipe 31. A pin 37 provided for pivotal connection between the clevis and tongue and approved means may be adopted for retaining the pin in position.

While I have shown one set of elements and combinations thereof for effectuating my improved truck, it will be understood that the same is intended for purpose of illustration only and in nowise to restrict the disclosure to the exact forms and structures shown, for many changes may be made therein without departing from the spirit of my invention.

I claim:

1. In a railway car truck, the combination of a side frame having a window opening, springs carried by said frame, a truck bolster having engagement with said frame through said opening, a guide lug formed on said bolster for engaging one side of said frame, a bar insertible through said bolster for engagement with the opposite side of said frame, and means for retaining said bar in position including stops on said bar engaging against the sides of the bolster.

2. In a railway car truck, the combination of a side frame having a window opening, springs carried by said frame, a truck bolster having engagement with said frame through said opening, a guide lug formed on said bolster for engaging one side of said frame, a bar insertible through said bolster for engagement with the opposite side of said frame, and means for retaining said bar in position including bolt members through said bar engaging with the side walls of said bolster.

3. In a railway car truck, the combination of a side frame having a window opening, springs carried by said frame, a truck bolster having engagement with said frame through said opening, a guide lug formed on said bolster for limiting in one direction the transverse movement of said bolster through said opening, and a bar insertible through said bolster closer to the bottom than to the top thereof for limiting its transverse movement in the opposite direction.

4. In a railway car truck, the combination of a side frame having a window opening, springs carried by said frame, a truck bolster having engagement with said frame through said opening, a guide lug formed on said bolster for engaging one side of said frame, a bar insertible through said bolster closer to the bottom than to the top thereof for engagement with the opposite side of said frame, and means for retaining said bar in position including bolt members through said bar abuttingly engaging against the inner surfaces of the side walls of said bolster.

5. In a railway car truck, the combination of a pair of side frames, springs carried by said frames, a bolster resting on said springs, and a tie link connecting said frames and free from the load impressed on said springs, said link comprising a pipe and means secured within the ends thereof for securement to said frames.

6. In a railway car truck, the combination of a pair of side frames, springs carried by said frames, a bolster resting on said springs, and a tie link connecting said frames and free from the load impressed on said springs, said link comprising a pipe and eye pieces including shanks secured within the ends thereof for securement to said frames.

7. In a railway car truck, the combination of a pair of side frames, a pair of spaced, inwardly extending projections on said frames having aligned holes, a spring plate carried by each of said frames and extending over said holes, springs resting on said plates, a bolster on said springs, a tie link connecting said frames free from the load impressed on said springs, the ends of said link being insertible betweeen said projections, and a pin extending through said holes beneath said plate and each end of said link.

8. In a railway car truck, the combination of a pair of side frames, a pair of spaced, inwardly extending projections on said frames having aligned holes, springs carried by said frames, a bolster resting on said springs, a tie link connecting said frames free from the load impressed on said springs, the ends of said link being insertible between said projections, and a pin extending through said holes and each end of said link, said pin being carried by said lower projection.

9. In a railway car truck, the combination of a pair of side frames, a pair of spaced, inwardly extending projections on said frames having aligned holes, a spring plate carried by each of said frames and extending over said holes, springs resting on said plates, a bolster on said springs, a tie link connecting said frames free from the load impressed on said springs, the ends of said link being insertible between said projections, and a pin extending through said holes and each end of said link, said pin being disposed below said plate and carried by said lower projection.

10. A tie link for connecting the side frames of a railway car truck comprising a member having eye members with shanks secured within the ends thereof for attachment to the frames, said member being arranged to resist tensional and compressional stresses.

11. In a railway car truck, the combination of a pair of side frames each having a spring seat, a pair of upper and lower spaced inwardly extending projections on the inner side of each frame having alined holes, the upper projection being flush with and a continuation of the seat, springs resting on said seats, a bolster extending across the side frames and resting upon said springs, a tie link connecting said frames free from the load imposed on said springs and having its ends apertured and engaged between said pairs of projections, and a pin extending through said holes and the apertured end of each link.

12. In a railway car truck, the combination of a pair of side frames each having a spring seat and each formed at its inner side with a projection flush with and constituting a continuation of the spring seat, springs resting upon each seat, a bolster connecting the side frames and resting upon said springs, and a tie rod pivotally connected with said projections.

In testimony whereof, I affix my signature.
THOMAS H. SYMINGTON.